United States Patent
Houchens et al.

(10) Patent No.: US 11,301,604 B1
(45) Date of Patent: Apr. 12, 2022

(54) REINFORCED SHIPPING CONTAINER

(71) Applicant: Amazon Technologies, Inc., Seattle, WA (US)

(72) Inventors: Kimberly Sue Houchens, Seattle, WA (US); Vasitha Nihal Obeyesekere, Seattle, WA (US); David Joseph Gasperino, Lake Forest Park, WA (US); Justine Mahler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 16/784,017

(22) Filed: Feb. 6, 2020

Related U.S. Application Data

(60) Provisional application No. 62/942,029, filed on Nov. 29, 2019.

(51) Int. Cl.
*G06F 30/23* (2020.01)
*B65D 5/44* (2006.01)
*G06F 119/14* (2020.01)
*G06F 111/04* (2020.01)
*G06F 119/18* (2020.01)
*G06F 113/20* (2020.01)

(52) U.S. Cl.
CPC ............. *G06F 30/23* (2020.01); *B65D 5/443* (2013.01); *G06F 2111/04* (2020.01); *G06F 2113/20* (2020.01); *G06F 2119/14* (2020.01); *G06F 2119/18* (2020.01)

(58) Field of Classification Search
CPC .. G06F 30/23; G06F 2111/04; G06F 2119/18; G06F 2113/20; G06F 2119/14; B65D 5/443
See application file for complete search history.

(56) References Cited

U.S. PATENT DOCUMENTS

| | | | |
|---|---|---|---|
| 5,292,391 A | 3/1994 | Wallick | |
| 2013/0037432 A1* | 2/2013 | Chang | B65D 85/07 206/299 |
| 2013/0126594 A1* | 5/2013 | Gasior | B65D 5/4266 229/198.2 |

(Continued)

FOREIGN PATENT DOCUMENTS

| | | |
|---|---|---|
| EP | 0605475 | 7/1994 |
| WO | 2008008576 | 1/2008 |

OTHER PUBLICATIONS

"PCT Application No. PCT/HU2005/000096" Sep. 7, 2005, 22 pages.

*Primary Examiner* — Kibrom K Gebresilassie
(74) *Attorney, Agent, or Firm* — Kilpatrick Townsend & Stockton LLP

(57) ABSTRACT

A reinforced shipping container along with method for generating the reinforced shipping container are described herein. A digital model of the shipping container is received and simulated with an expected load. The expected load may represent an expected loading scenario for the shipping container during shipment. A reinforcement profile is determined based on stress data developed from the simulation to increase a strength-to-weight ratio of the shipping container. The reinforcement profile is used to apply a reinforcing agent to a substrate used to form the shipping container in a selective manner to reinforce regions of the shipping container that will experience stresses during shipping.

20 Claims, 12 Drawing Sheets

(56) References Cited

U.S. PATENT DOCUMENTS

| | | | |
|---|---|---|---|
| 2013/0334295 A1* | 12/2013 | Swenson | B65D 5/54 |
| | | | 229/122 |
| 2016/0217221 A1* | 7/2016 | Bhat | G06F 30/20 |
| 2016/0259865 A1* | 9/2016 | Neerukonda | G06F 17/10 |
| 2018/0094966 A1* | 4/2018 | Buether | B62D 53/068 |
| 2021/0261326 A1* | 8/2021 | Phelps | B65D 85/62 |

\* cited by examiner

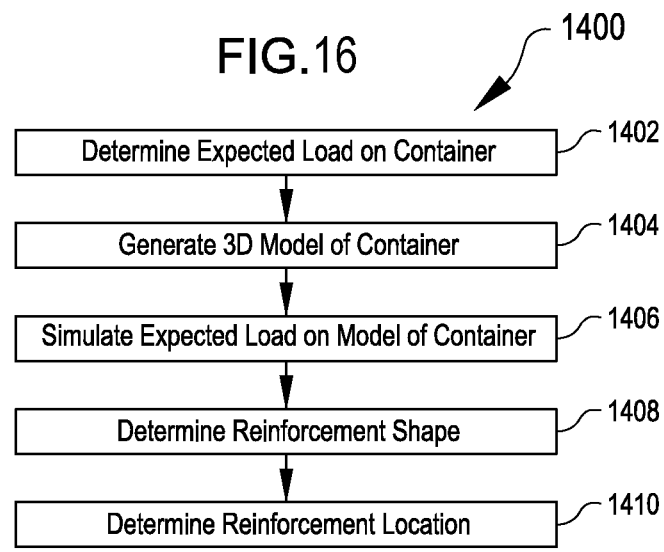
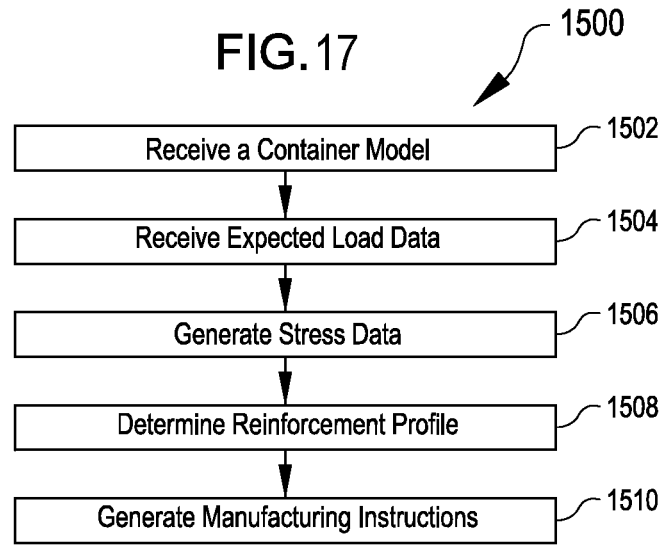

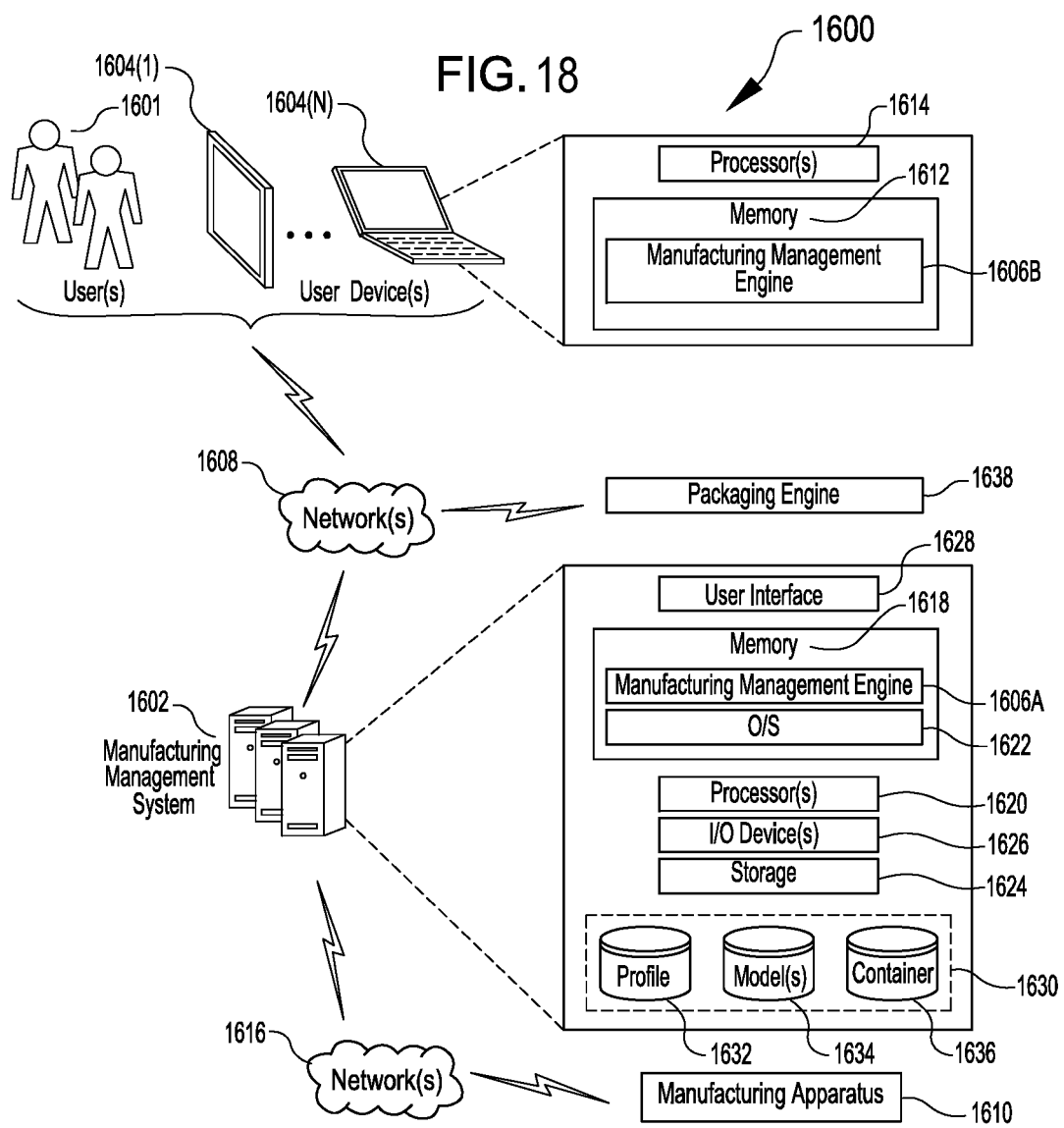

REINFORCED SHIPPING CONTAINER

CROSS REFERENCE TO RELATED APPLICATIONS

This application is a nonprovisional of and claims priority to U.S. Provisional Application No. 62/942,029, filed Nov. 29, 2019, and titled "REINFORCED SHIPPING CONTAINER," the contents of which are herein incorporated in its entirety.

BACKGROUND

It has become commonplace for items to be shipped from various parts of the world using different transportation systems. For example, for delivery to an end user, an item may be loaded from a warehouse into a semi-truck, from the semi-truck into a delivery van, and from the delivery van to the end user's location. To protect the items while in transit, the items, both big and small, can be packaged within low-cost boxes produced at large scale, often made of wood-based fibrous material. And while this protection is beneficial, because costs for shipping the items are typically based on weight, the addition of the boxes may result in undesirable costs.

BRIEF DESCRIPTION OF THE DRAWINGS

Various embodiments in accordance with the present disclosure will be described with reference to the drawings, in which:

FIG. 16 illustrates an example process for reinforcing a shipping container, according to at least one example;

FIG. 17 illustrates an example process for generating manufacturing instructions for a reinforced shipping container, according to at least one example;

FIG. 18 illustrates an example schematic architecture for implementing techniques relating to generating instructions for manufacturing shipping containers with reinforced panels, according to at least one example.

DETAILED DESCRIPTION

Figure 1:
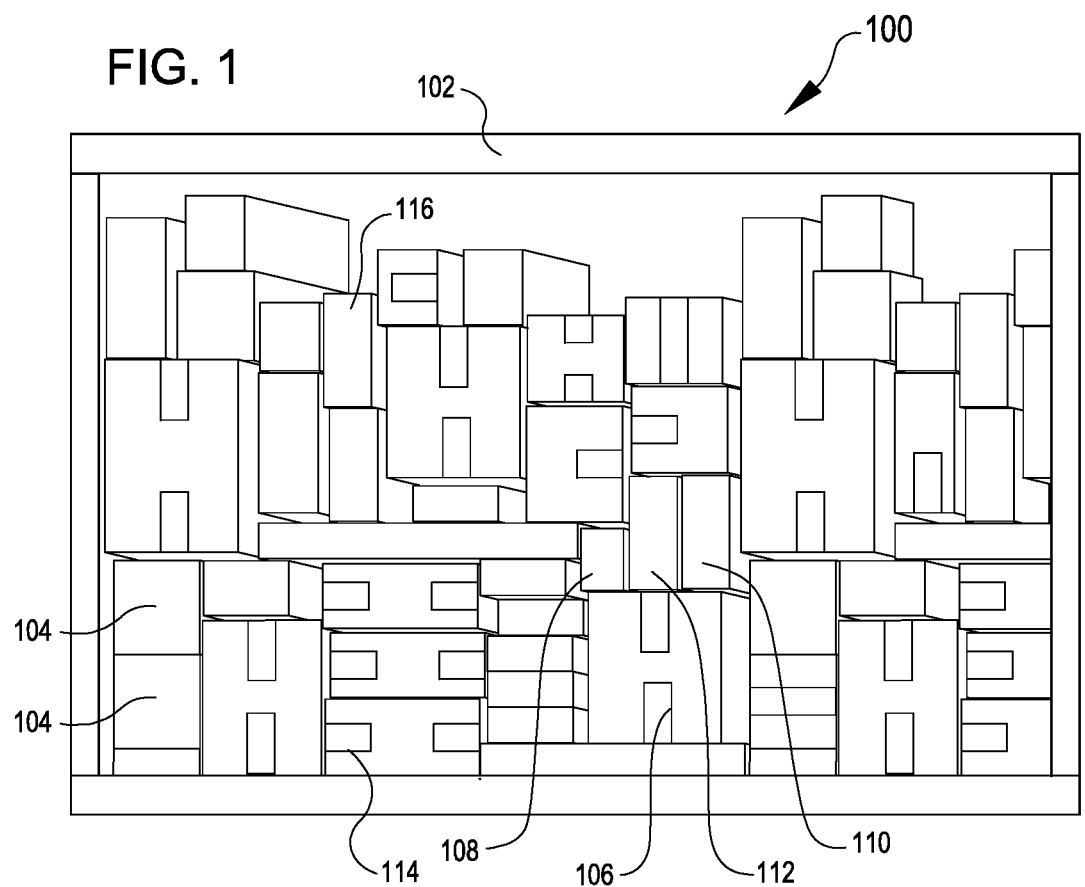
FIG. 1 illustrates an example shipping environment including a stack of shipping containers in a vehicle, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to reinforcing shipping containers in a selective manner to reduce overall weight (as compared to fully-reinforced shipping containers) and associated shipping costs. Specifically, features herein are directed to a method of reinforcing fiberboard based shipping boxes to provide lightweight, yet strong shipping boxes. As used herein, fiberboard encompasses materials formed of fibers, including wood fibers, that may include multi-ply or single-ply products. Fiberboard products include paperboard, cardboard, as well as corrugated materials. A fiberboard based shipping box that has been reinforced using the method described herein may include six sides formed of a fiberboard substrate and include selective reinforcement applied to one or more of the sides. This reinforcement provides improved strength and rigidity to the box during shipment to prevent crushing of the shipping box. The reinforcement may be applied to a single side or both sides of a panel of the shipping box. The reinforcement also enables the weight of the shipping boxes to be reduced because the reinforcement is selectively applied to a substrate, resulting in less overall packaging material and less weight to be shipped with each item. The selective application of reinforcement also enables use of fiberboard, or other products, that may on their own be too weak to withstand forces encountered during shipping, further reducing the weight of the shipping boxes.

In accordance with an embodiment, a shipping box is formed of a thin, lightweight fiberboard material, such as a thin cardboard, or even a single sheet of a fiberboard product. The shipping box is expected to withstand various static and dynamic loads during shipping. For example, the shipping box may be loaded in a vehicle, stacked with other boxes, or come into sliding contact with other boxes on a slide or conveyor system. The single sheet of fiberboard may not be sufficient to withstand the expected forces but is extremely lightweight to reduce costs of shipping, which are typically based on weight. A reinforcement may be applied to the fiberboard to provide additional strength, rigidity, elasticity, or other material properties to the shipping box that the fiberboard alone cannot supply. The reinforcement is applied selectively to prevent adding additional unnecessary weight and is selectively applied in a pattern to maximize the impact on the crush strength, impact resistance, or other properties of the shipping box.

In an example, the shipping box reinforcement is generated by generating a digital model of a shipping box and performing a simulation on the digital model to replicate an expected load that may be applied to the shipping box during transportation. The simulation generates stress data and can be used to identify areas of high stress or weakness in the shipping box model. A shape for a reinforcement is then generated based on the high stress areas of the shipping boxes to provide additional reinforcement to those areas but not to other areas of the shipping boxes to help reduce the weight of the packaging. The reinforcement shape is then sent to a manufacturing line where sides or panels of a material used to form the shipping boxes are coated with a reinforcing material in the reinforcement shape. The fiberboard material forming a shipping container including the reinforcement may be lightweight, or lighter than typical shipping box material because of the added reinforcement to reduce the weight of the shipping box but still provide the needed strength and rigidity to withstand shipping.

In some examples, the methods and systems described below provide additional benefits to the appearance (e.g., aesthetics) of shipping containers in addition to other features described herein. For example, the use of lightweight fiberboard materials having reinforcement may enable the use of thinner fiberboard materials and therefore allow for tighter folding radii in corners, resulting in clean crisp folding lines for packaging. Additionally, with such thinner materials, less force may be required to fold or form a packaging product and packaging may be opened more easily by a consumer.

FIG. 1 illustrates an example shipping environment 100 including a stack of shipping containers in a vehicle 102, according to at least one example. As shown in the example shipping environment 100, the shipping containers may be stacked edge to edge in some cases, which provides greater crush resistance, or may be stacked with other boxes of unequal sizes in suboptimal loadings. For example, boxes 104 are each of the same shape and size. When boxes 104 are stacked one on top of the other, as shown, the weight of the upper box 104 is transferred along the edges of the lower box 104 rather than into the middle of a face of the boxes 104. When weight is transferred to the middle of a face of a shipping container it may crease or buckle, which greatly reduces the strength of the shipping container and increases the likelihood of the shipping container and the items inside being crushed or damaged. For example, boxes 108, 110, and 112 all rest on an upper face of box 106. Rather than advantageously transferring weight along the edges of box 106, the weight of box 112 is centered on box 106 and may cause the upper face to buckle or collapse.

In some examples, shipping containers may be loaded into the vehicle 102 in an orientation that is more prone to collapse or buckling than other orientations. For example, boxes 114 and 116 each have an aspect ratio of less than one, indicating that it is longer in one dimension than in another dimension or that it is long and thin rather than square in the cross-section. The long side or face of the box is more susceptible to buckling or creasing because of the larger span. When loaded with the long side or face of the box horizontal to a supporting surface, with other boxes stacked on top, the long face of the shipping container, such as box 114, is likely to crease or buckle, weakening the entire box 114. Instead, box 116 is turned such that a top load on box 116 is less likely to crease or buckle the face of the box.

Figure 2:
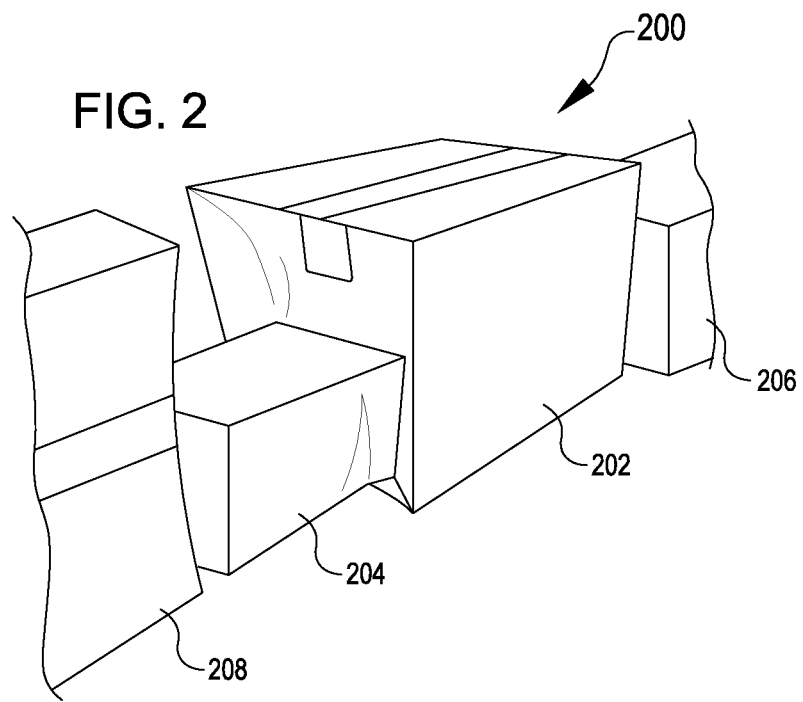
FIG. 2 illustrates an example collision between adjacent shipping containers during shipping, according to at least one example.

FIG. 2 illustrates an example collision 200 between adjacent shipping containers during shipping, according to at least one example. Though many loads on shipping containers are static top loads, as described above with respect to FIG. 1, shipping containers also experience side loads and dynamic loads. For example, on some conveyor or chute systems, adjacent shipping containers collide end-to-end. While most typical shipping containers are designed to withstand static top loads, they are not typically equipped or designed to withstand a side collision. In the example collision 200, a large box 202 is struck by a smaller box 204. The smaller box 204 may cause the side of larger box 202 to crease or buckle, significantly reducing the strength of the larger box 202. Additional boxes 208 and 206 may continue to provide a load or force pushing the larger box 202 and the smaller box 204 together, even after an initial collision. These types of collisions and side impacts are increasingly common with the increase of item shipping in individual packages and shipment centers that rely on conveyor and chute systems to move shipping containers through warehouses for shipment.

Figure 3:
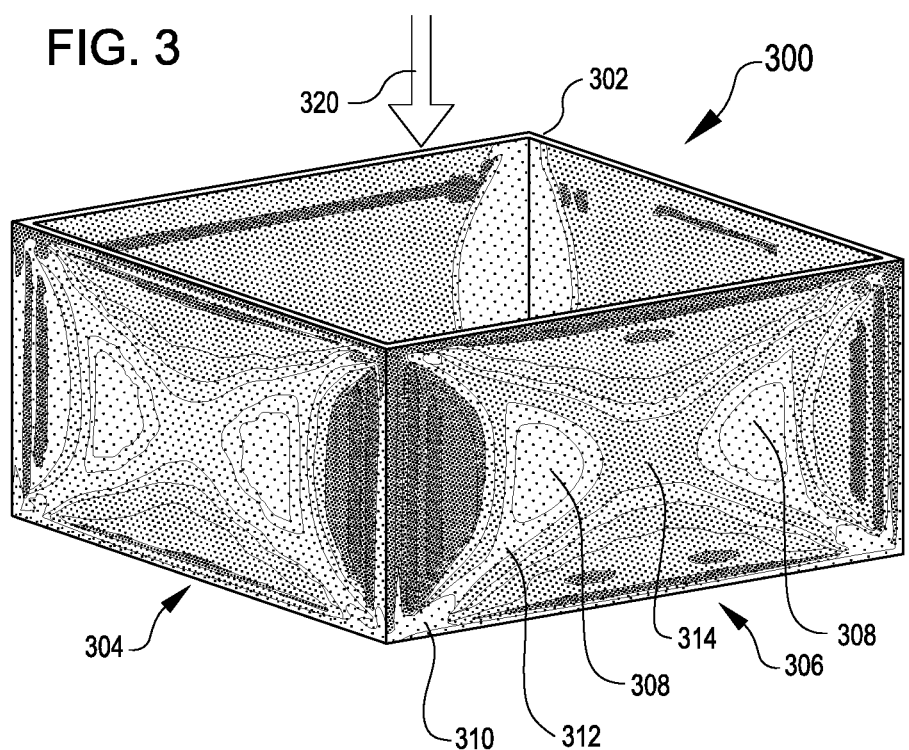
FIG. 3 illustrates an example stress profile of a shipping container generated using a finite element analysis technique, according to at least one example.

FIG. 3 illustrates an example stress profile of a shipping container 300 generated using a finite element analysis, according to at least one example. Finite element analysis involves numerical method for solving partial differential equations in two or three space variables. The system is divided into smaller parts called finite elements. The finite elements are then modeled in a discrete manner and assembled into a larger system that models the entire environment. Finite element analysis is particularly useful for simplifying problems with complex variables or complex engineering problems. Stress analysis, fluid dynamics, and heat transfer are examples of situations involving complex analysis that may be difficult to solve without breaking into discrete parts via the finite element analysis. Finite element analysis may be performed with software applications designed to discretize components of an engineering problem to provide solutions and data in a simulated environment. The shipping container 300 is a digital model representing a physical box. The shipping container 300 is simulated with a static load on a top edge 302 and a fixed bottom edge 304 to resist the load. The load in the simulation is based on an expected load the physical box is expected to experience during shipping.

On a side panel 306 of the shipping container 300, a stress profile is shown having different sections relating to differing levels of stress within the side panel 306 as a result of the load. For example, a first section 308 of the side panel 306 may have a first level of stress. A second section 310 may have a second level of stress, and a third section 312 may have a third level of stress. The first level of stress in the first section 308 may be greater than the second level of stress in the second section 310 and third level of stress in the third section 312. There may be further additional stress levels represented by the digital model (e., in a gradient from the highest stress to the lowest stress on the side panel 306).

Though a top load scenario is shown, the shipping container 300 may be simulated with a dynamic or an impact load on a top, bottom, or side of the shipping container 300 to identify regions of stress or weakness that should be reinforced on the shipping container 300. In some examples, multiple loads may be simultaneously simulated, such as a top load in conjunction with a side impact to identify the regions described herein.

Figure 4:
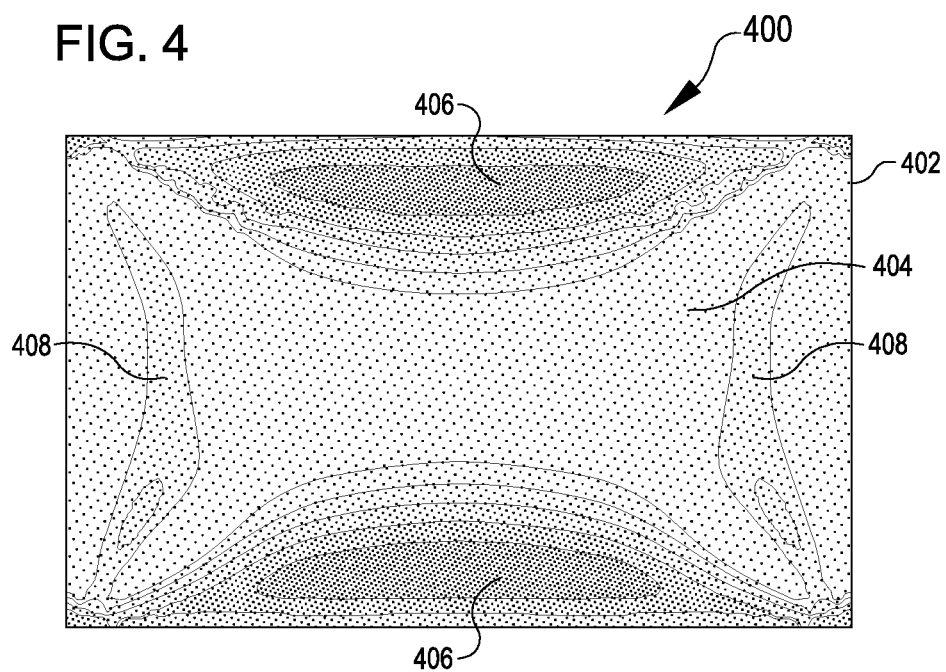
FIG. 4 illustrates an example stress profile of a panel of a shipping container generated using finite element analysis, according to at least one example.

FIG. 4 illustrates an example stress profile of a panel 400 of a shipping container, such as the shipping container 300 generated using finite element analysis, according to at least one example. On the panel 400, region 404 corresponds to a highest level of stress on the panel 400, region 406 corresponds to a lowest level of stress on the panel. The stresses on the panel vary based on location between the highest and the lowest level of stress. An intermediate region 408 may have a level of stress between the highest and the lowest level of stress.

Figure 5:
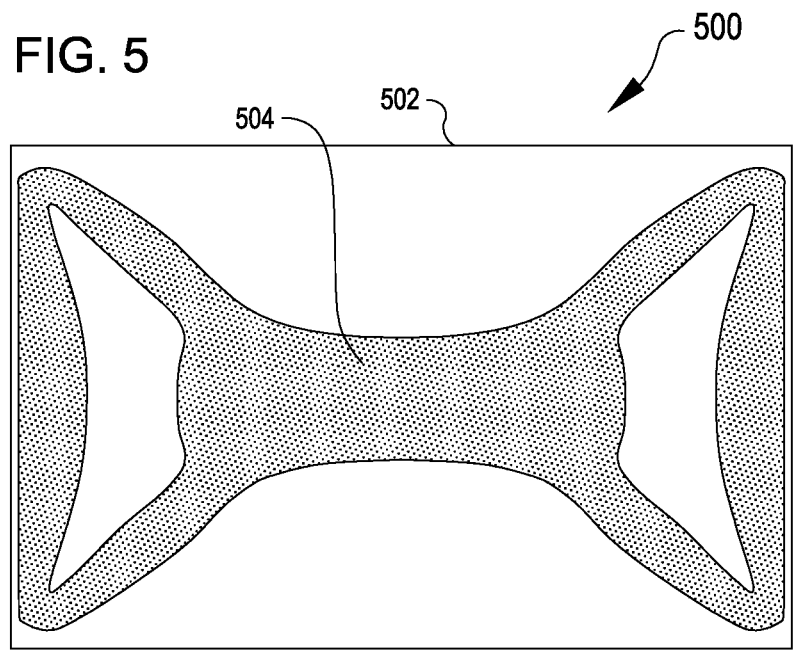
FIG. 5 illustrates a reinforcement profile of the panel of FIG. 4 based on the stress profile, according to at least one example.

FIG. 5 illustrates a reinforcement profile 504 of a panel 500, which may represent the panel 400 of FIG. 4, according to at least one example. The panel 500 also includes an unreinforced portion 502, where no reinforcement is to be applied. The reinforcement, which is formed in the pattern illustrated by the reinforcement profile 504, may be an epoxy, a resin, a starch additive, a lignosulfonate compound, a foam, an expanding foam, a glue, a crystalline epoxy resin, a work-hardening material such as a work hardening adhesive, or any other stiffening agent that can be painted, sprayed, rolled, applied, glued, impregnated, secured, or otherwise affixed to or included within a substrate. The work-hardening material may be applied before folding or forming a shipping container and upon folding the deformation involved in folding the product may work-harden the material to provide stiffness. The reinforcement profile 504 may, in some examples, be cut from a substrate of reinforcement material and glued or applied to a fiberboard substrate of the panel 500. The reinforcement may be applied to one or both sides of panel 500. The reinforcement profile 504 is generated based on the stress profile of FIG. 4. In some examples, the reinforcement profile 504 may be generated by identifying the highest stress levels (e.g., from the stress data derived by the simulation illustrated in FIG. 4). The reinforcement profile 504 may also be generated based on the stress data exceeding a predetermined threshold. The predetermine threshold may include a stress criterion that defines a stress level at or above which the shipping container may be reinforced to strengthen the shipping container. The predetermined threshold may be a fraction or percentage or a strength of the substrate. For example, the threshold may be fifty percent, sixty percent, seventy percent, eighty percent, or ninety percent of the material strength such as the crush strength, buckling strength, compressive strength, or other material property. Any stress levels that exceed the predetermined threshold are used to identify portions of the panel 500 that receive reinforcement.

In another example, the reinforcement profile 504 may be based on a percentage of the surface area of the panel 500. For instance, the reinforcement profile 504 may be determined to cover an area that is a percentage of the panel surface area. A surface area criterion may define a threshold of surface area which may be coated with reinforcement. The surface area criterion increases if the reinforcement has a density near the substrate density and decreases (indicating less of the surface area of the substrate may be coated) when the reinforcement has a higher density than the substrate. Reducing the percentage of the surface area covered by the reinforcement results in a lower weight to the panel 500 and therefore the shipping container. It also results in lower added strength to the panel 500. In one specific example, the reinforcement profile 504 may be less than forty percent of the surface area of the panel. In another example, the reinforcement profile 504 may be less than twenty, less than ten, or less than five percent of the surface area of the panel. In an example with forty percent coverage, forty percent of the surface area of the substrate may be coated with the reinforcement. The surface area coverage may correspond to only one side of a panel, or may relate to a surface area of both sides of a panel of a shipping container.

In another example, the reinforcement profile 504 may be based on material properties of the reinforcing material as well as the fiberboard or other substrate used to form the panel 500. For example, the density of the reinforcing material and the density of the fiberboard substrate may be considered to reduce the overall weight of panel 500. For instance, panel 500, when formed of corrugated fiberboard may have a first overall weight. When a single fiberboard substrate and reinforcement are combined, it may be desirable that the resulting weight be less than the corrugated weight to result in overall weight savings for the shipping container. Other material properties that may be considered in determining the reinforcement profile 504, such as to be input into a topological modeling simulation include the tensile strength, elasticity, rebound strength, Poisson's ratio, and Young's modulus. Other material properties may likewise be incorporated.

Figure 6:
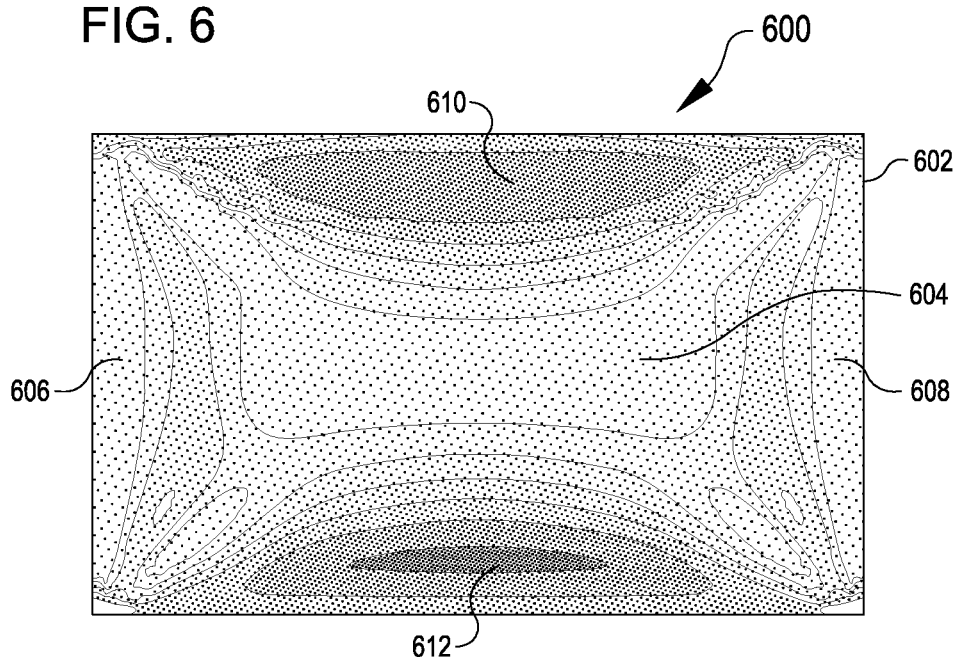
FIG. 6 illustrates an example stress profile of a panel of a shipping container generated using a finite element analysis technique, according to at least one example.

FIG. 6 illustrates an example stress profile of a panel 600 of a shipping container generated using a finite element analysis, according to at least one example. The panel 600 is defined within edge 602 where the panel 600 abuts an adjacent panel and includes a number of regions 604, 606, 608, 610, and 612 corresponding to varying levels of stress experienced by the panel 600. These regions 602, 604, 606, 608, 610, and 612 may be similar to the regions 402, 404, 406, and 408 of FIG. 4.

Figure 7:
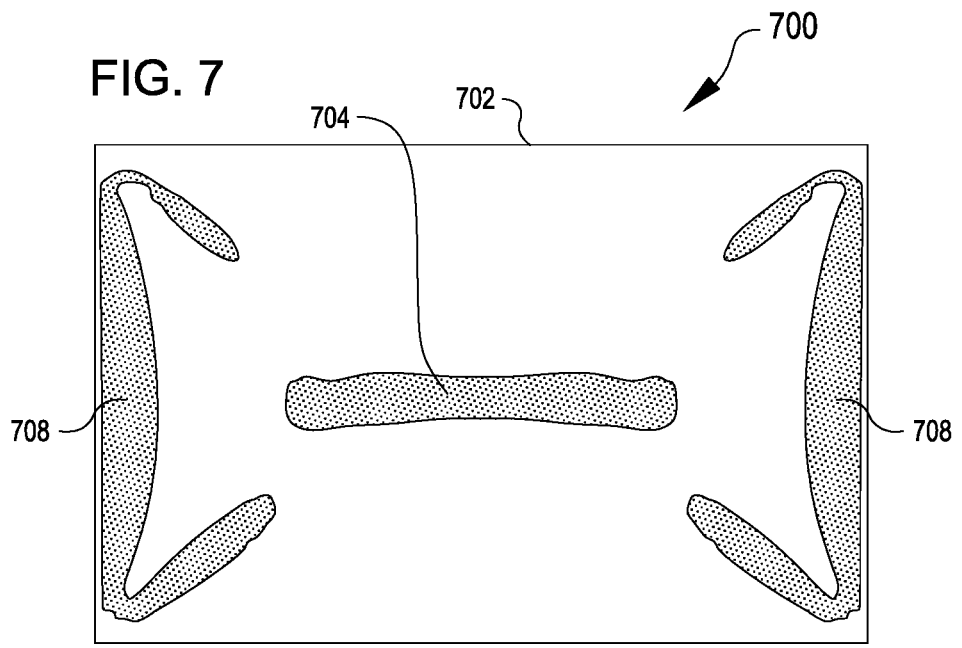
FIG. 7 illustrates a reinforcement profile of the panel of FIG. 6 based on the stress profile, according to at least one example.

FIG. 7 illustrates a reinforcement profile of a panel 700 representing the panel 600 of FIG. 6. As described above, panel 700 has edge 702 where panel 700 abuts adjacent panels which may have additional reinforcements. Furthermore, the reinforcement profiles 704, 706, and 708 covers a smaller surface area of the panel 700. Additionally, unlike the reinforcement profile 504, the reinforcement profiles 704, 706, and 708 are separate distinct regions that are not connected. These regions correspond to the levels of highest stress within the panel 600 to provide additional strength and rigidity to those regions.

Figure 8:
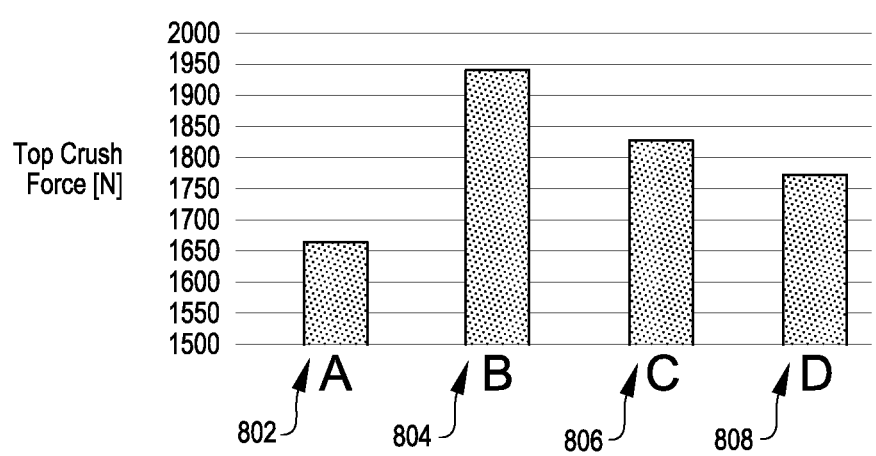
FIG. 8 illustrates a chart of crush force for four example shipping containers, according to at least one example.

FIG. 8 illustrates an chart 800 of crush force for four different shipping containers, according to at least one example. The chart 800 shows a crush force for a fiberboard shipping container 802, a fully coated fiberboard shipping container 804, a forty percent coated fiberboard shipping container 806, and a twenty percent coated shipping container 808. The fiberboard shipping container 802 is the smallest, indicating it can be crushed with the smallest load while the fully coated fiberboard shipping container 804 has the highest top crush force. The fully coated fiberboard shipping container 804 also has the highest weight of all the examples. The forty and twenty percent coated fiberboard shipping containers 806 and 808 each have a crush force less than that of the fully coated fiberboard shipping container 804 but also have a lower overall weight.

Figure 9:
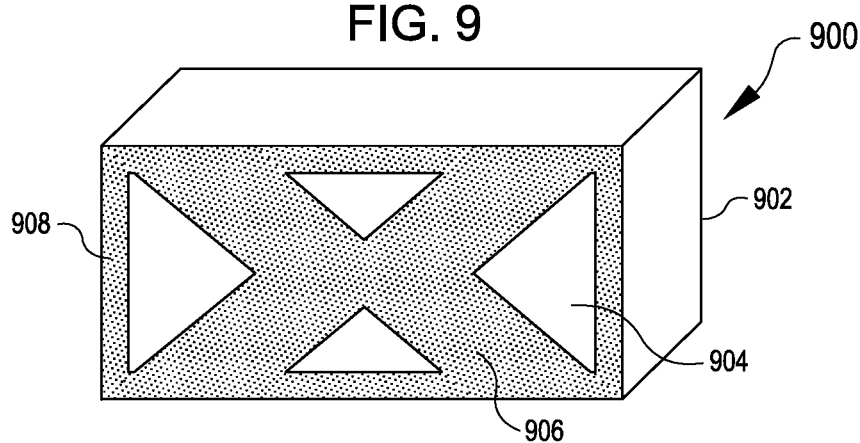
FIG. 9 illustrates a simplified reinforcement profile, according to at least one example.

FIG. 9 illustrates a simplified reinforcement 906, similar to the reinforcement profile 504 described above, according to at least one example. The simplified reinforcement profile 906 has an X shape extending from each of the corners of panel 904 of shipping container 900. Adjacent panel 902 may not include a simplified reinforcement, or may include a reinforcement on an inside of the shipping container 900. This example, as with all other examples described herein, may be applied to an inner, an outer, or both sides of a panel 904 of a shipping container 900.

The simplified reinforcement 906 may be determined based on the stress profile of a simulation, as described above. The simplified reinforcement 906 may use a simple geometry that is simpler to apply to a panel. For example, the simplified reinforcement 906 may be painted or sprayed on panel 904 in two simple movements. The ease of manufacturing may speed up construction or manufacturing of shipping containers 900 and also provide advantages described herein.

In an example, a finite element analysis may be performed on a model of a shipping container to generate stress data as described below. The stress data may be used to select a closest-fitting shape from a library of geometric shapes. The closest-fitting shape of the library is selected based on how closely it matches or corresponds to a shape of a region within the stress data having a stress level above a stress threshold as described above. The geometric shapes may include basic geometric shapes as well as permutations or adjustments to the geometric shapes.

Figure 10:
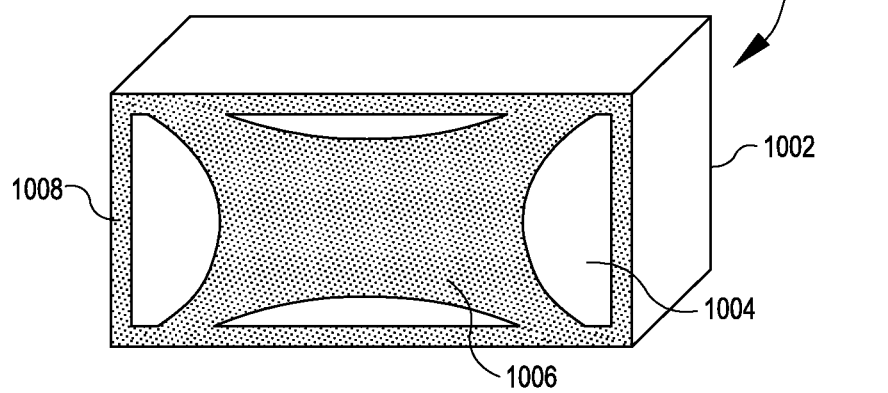
FIG. 10 illustrates a simplified reinforcement profile, according to at least one example.

FIG. 10 illustrates a simplified reinforcement profile 1006, according to at least one example. The simplified reinforcement profile 1006 may be based on the stress data identifying regions of higher stress and simplifying the profile of the reinforcement region rather than applying a complex geometry to the panel 1004. Shipping container 1000 may be manufactured by spraying a reinforcement material through a template or guide onto the fiberboard in the pattern shown in the simplified reinforcement profile 1006.

Figure 11:
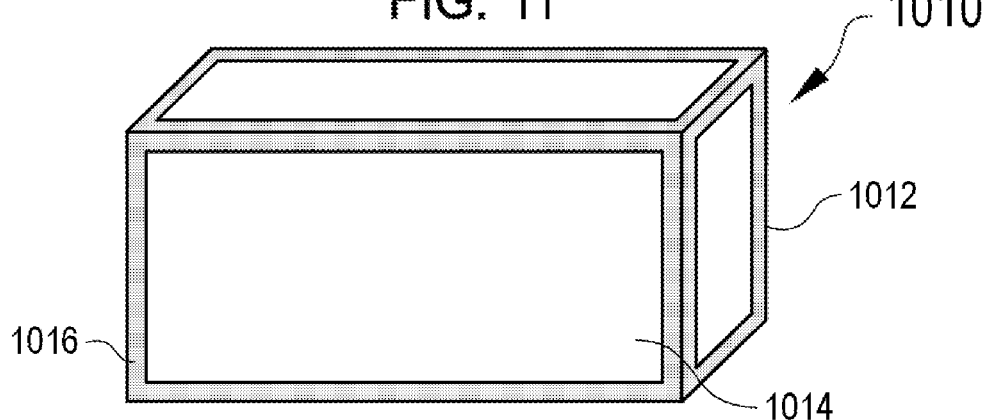
FIG. 11 illustrates a simplified reinforcement profile, according to at least one example.

FIG. 11 illustrates a simplified reinforcement profile 1016, according to at least one example. The simplified reinforcement profile 1016 may be based on the stress data identifying regions of higher stress and simplifying the profile of the reinforcement region rather than applying a complex geometry to the panel 1014. In some examples, the reinforcement profile 1016 may be along crease lines or fold lines for the shipping container. As described above, in some examples, the reinforcing material may include a work hardening material that stiffens or work hardens to provide strength and rigidity as the shipping container is folded. Shipping container 1010 may be manufactured by spraying a reinforcement material through a template or guide onto the fiberboard in the pattern shown in the simplified reinforcement profile 1016 or by any other method, technique, or system described herein.

Figure 12:
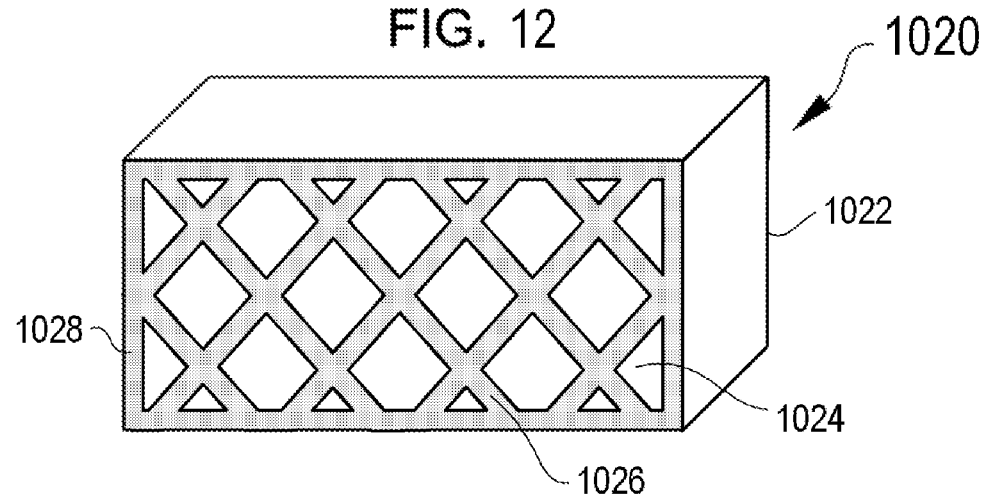
FIG. 12 illustrates a simplified reinforcement profile, according to at least one example.

FIG. 12 illustrates a simplified reinforcement profile 1026, according to at least one example. The simplified reinforcement profile 1026 may be based on the stress data identifying regions of higher stress and simplifying the profile of the reinforcement region rather than applying a complex geometry to the panel 1024. In particular, FIG. 12, shows a uniform web pattern applied over panel 1024. In some examples, the web patter may be replaced by other geometric patterns such as curves, crossed segments, geometric shapes, and other such patterns. Shipping container 1020 may be manufactured by spraying a reinforcement material through a template or guide onto the fiberboard in the pattern shown in the simplified reinforcement profile 1026 or by any other method, technique, or system described herein.

Figure 13:
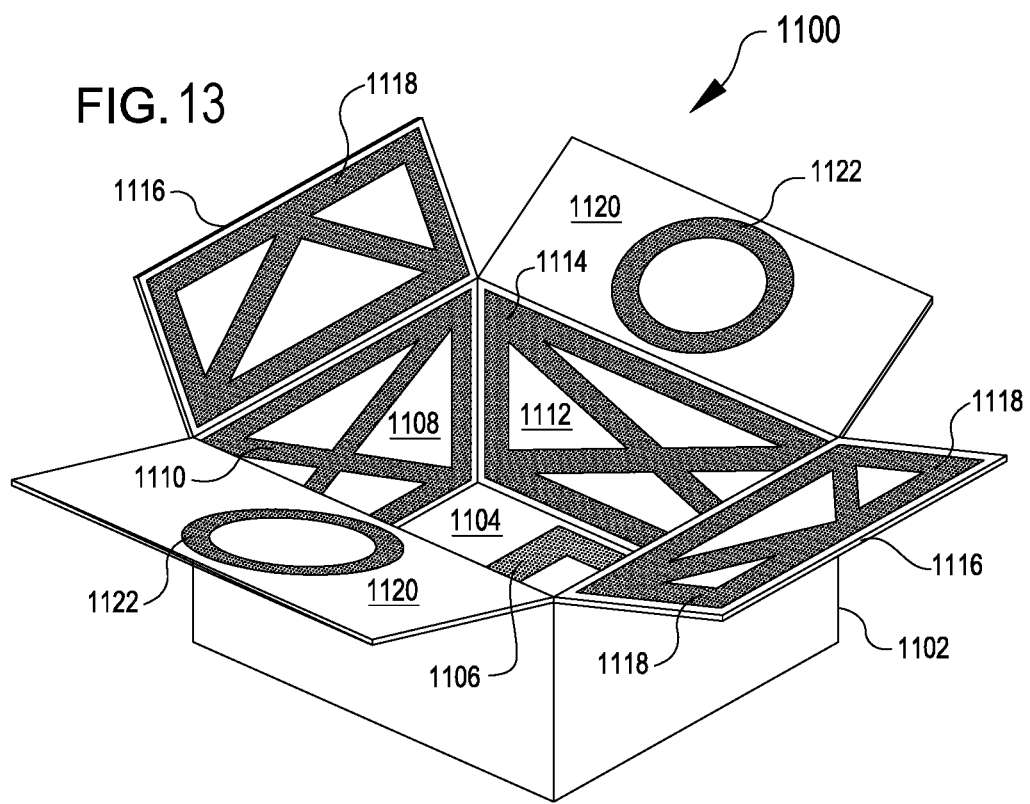
FIG. 13 illustrates an assembled shipping container having reinforced panels, according to at least one example.

FIG. 13 illustrates an assembled shipping container 1100 having reinforced panels, according to at least one example. The assembled shipping container 1100 includes a number of side panels, 1102, 1108, 1112 as well as panels 1116, 1120 that form the top and a panel 1104 (or several panels) that form the bottom of the assembled shipping container 1100. The panels 1102, 1108, 1112, 1116, 1120, and 1104 can be combined or connected to form a single piece of material and can be assembled into the assembled shipping container 1100 by gluing, taping, or otherwise securing the edges of the panels together.

Each panel of the assembled shipping container 1100 includes an applied reinforcement profile. For example, panel 1112 includes reinforcement 1114, panel 1108 includes reinforcement 1110, panel 1120 includes reinforcement 1122, panel 1116 includes reinforcement 1118, and panel 1104 includes reinforcement 1106. An exterior of panel 1102 does not have a reinforcement applied thereto, though, as described above, the reinforcement may be applied to the interior or exterior of each panel. Additionally, the reinforcement may be injected or applied to fill or partially fill interstitial voids of the panels (e.g., voids of a corrugated paper product). This may be injected after forming the corrugated paper product or may be applied while forming the corrugated paper product.

The reinforcement profiles shown in FIG. 13 are simplified reinforcement profiles of a resin or starch material. In some examples, the reinforcement profiles are the reinforcement profiles of FIGS. 5 and 7, as described above, or other such reinforcement profiles.

Figure 14:
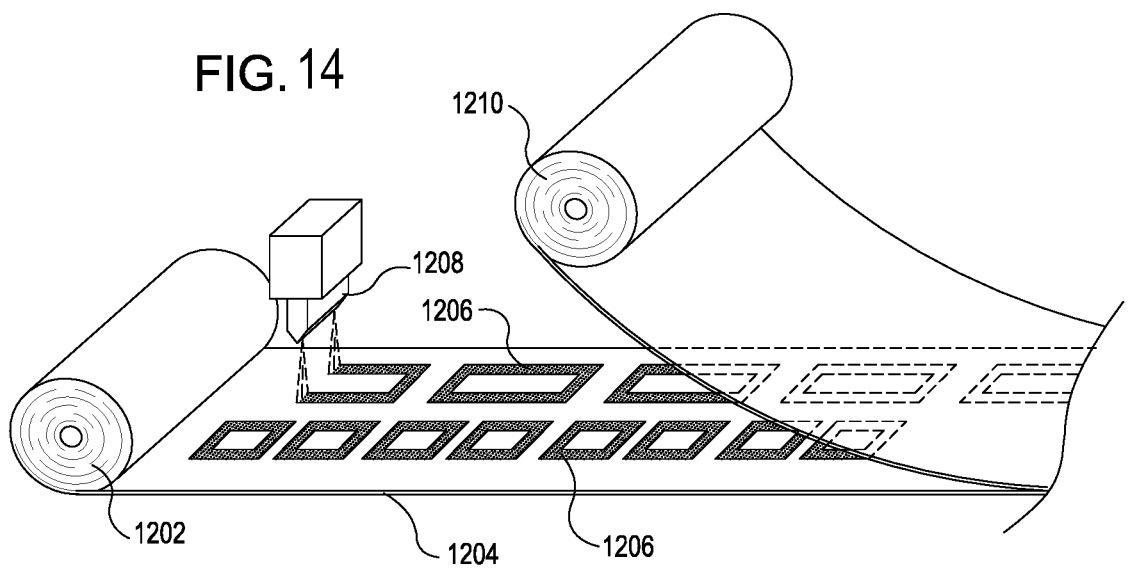
FIG. 14 illustrates a roll of substrate having reinforcement applied thereto and a second substrate connected to form a fiberboard product, according to at least one example.

FIG. 14 illustrates a roll of substrate having reinforcement applied thereto and a second substrate connected to form a fiberboard product, according to one example. In FIG. 14, a first roll 1202 of a fiberboard material is unspooled onto a flat sheet 1204. An application device 1208 applies a reinforcement profile 1206 of reinforcing material onto the flat sheet 1204 of fiberboard. In some examples, the application device 1208 may be a spraying, coating, painting, or other such application device. The application device 1208 may also include additional components not shown, such as a screen-printing mesh and plate for allowing reinforcing material to flow through the screen in selected regions and not in others. A template may likewise be used to apply the reinforcing material selectively in only the shape of the reinforcement profile 1206. The template (not shown) may be a negative of the reinforcement profile 1206 to result in the reinforcement profile 1206 being applied to the substrate. In some examples, the template may include gravure printing processes involving engraving the reinforcement profile 1206 onto an image carrier such as a cylinder for use in a rotary printing press. The template may also include flexographic print plates or flexography, including a flexible relief plate to which the reinforcing material is applied and transferred to the fiberboard material. The templates, including the gravure print plates and flexographic print plates, as well as other templates, such as screenprinting, may be designed using a computer aided design (CAD) program as part of the methods described below.

The reinforcement applied to the first roll 1202 may be applied to an interstitial void of a corrugated product. For example, a corrugated sheet may be inserted or sandwiched between the first roll 1202 and a second roll 1210. The corrugated sheet may have the reinforcement described above applied thereto. In some examples, the reinforcement may be applied to the corrugated sheet before it is formed into a corrugated sheet. The reinforcement may be applied to a flat sheet material which is subsequently corrugated to form flutes. In some examples, the reinforcement may be applied after fluting or after the corrugations are formed. In some examples, the reinforcement profile 1206 applied to the flat sheet that is subsequently fluted may have a reinforcement profile applied that accounts for the fluting operation. For example, the reinforcement profile may be distorted in a direction perpendicular to the direction of the fluting such that when the fluting is formed the reinforcement profile is returned to the reinforcement profile before the distortion. In a specific example, a reinforcement profile may include a circular shape on a panel. The reinforcement profile may be distorted into the shape of an oval and applied to the corrugated sheet before fluting such that when the fluting is formed in the corrugated sheet the reinforcement profile is circular.

Additionally, the reinforcement may be applied to any one of the layers of a multilayer product. As an example, a multilayer product having five layers may include reinforcements applied to any of the five layers, including any of the faces of the five layers. Additionally, on different layers of the multilayer product there may be different reinforcement profiles 1206. For example a first layer may have a reinforcement profile 1206 that strengthens the edges of a panel while a second layer may have reinforcement applied in a reinforcement profile 1206 that reinforces against buckling of the panel.

A second roll 1210 of fiberboard by be applied on the face of the flat sheet 1204 to produce a multi-layer fiberboard product with the reinforcement profile 1206 sandwiched between the layers of fiberboard. This may be included, for example in a stage of producing corrugated fiberboard products. A first sheet may have the reinforcing material applied and then have the corrugate and the second sheet applied to form the corrugated fiberboard. In some examples, multiple layers of the reinforcing material may be applied, such as a first layer on the flat sheet 1204, a second layer on a corrugated insert, and a third layer on the second roll 1210 of fiberboard. The layers may also be on top of previous layers of reinforcing material to produce a thicker reinforcement. For example, a first layer may be applied by the application device 1208 which is then cured either through natural processes or by a curing device (not shown) such as a UV light, heat applicator, or other such activation device. A second layer of reinforcing material may be applied on top of the first layer after it is cured to produce the thicker reinforcement.

Figure 15:
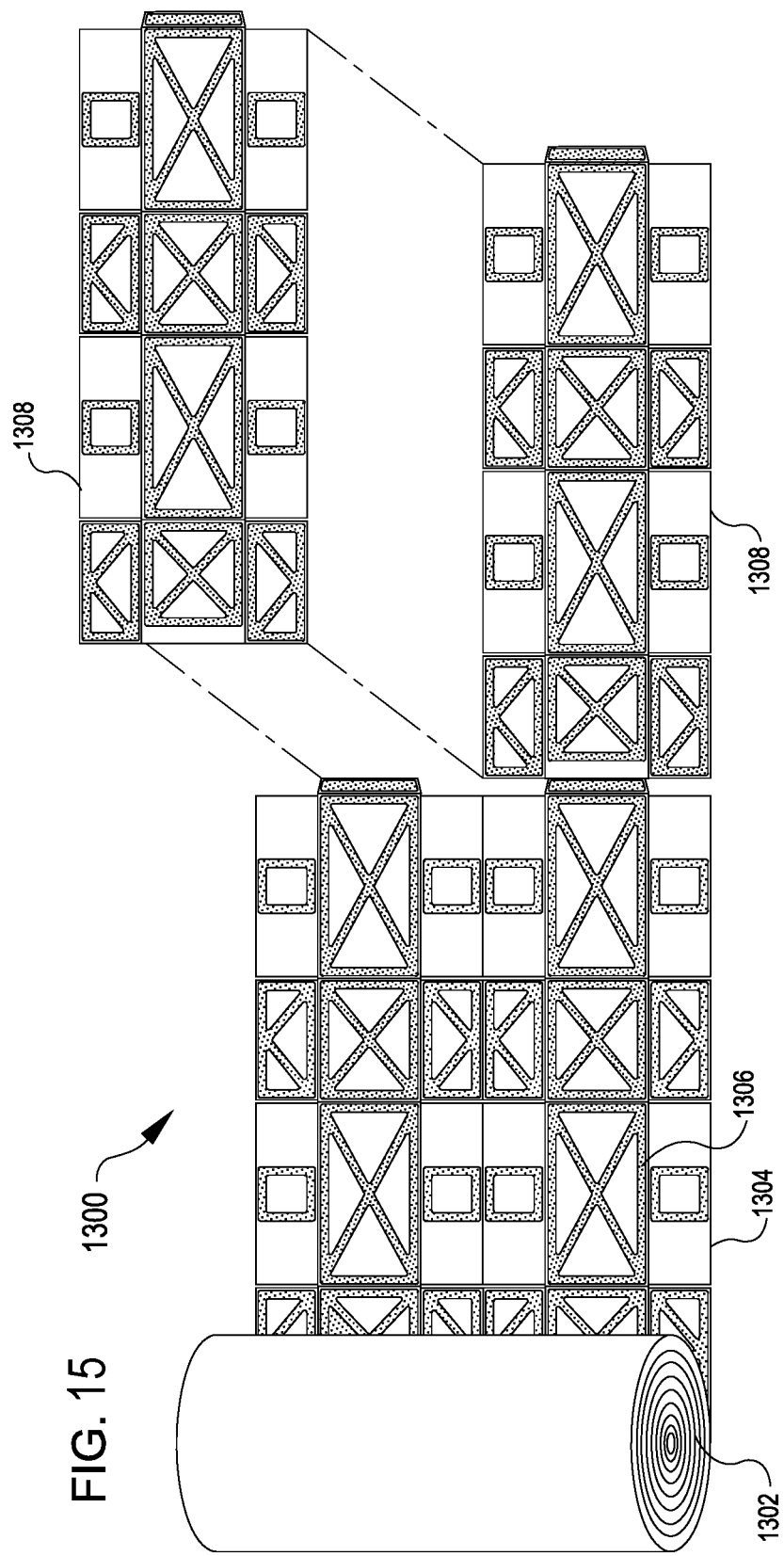
FIG. 15 illustrates a roll of substrate having reinforcement applied thereto and being separated to form individual shipping containers, according to at least one example.

FIG. 15 illustrates material for forming reinforced shipping containers 1300 including a roll of substrate 1302 having reinforcement 1306 applied thereto and being separated to form individual shipping containers 1308, according to at least one example. The roll of substrate 1302 may be a fiberboard sheet, a corrugated paper product, or other paper-based product suitable for forming a lightweight shipping container. As the roll of substrate 1302 is unrolled, the reinforcement 1306 may be applied onto the substrate 1304. The reinforcement 1306 may be painted on the substrate 1304, or may be sprayed, injected, glued, or otherwise applied to the substrate 1304 by a manufacturing apparatus, as described below. The reinforcement 1306 may be applied to the substrate 1304 as the substrate 1304 unrolls from the roll of substrate 1302. In some examples, the reinforcement 1306 may be applied before the substrate 1304 is rolled and therefore is already present on the roll 1302 as it is unrolled.

The reinforcement 1306 is applied or laid out on the substrate 1304 according to a layout used to form individual shipping containers. Each individual shipping container 1308 includes a number of panels that may be simultaneously cut from the substrate 1304 and subsequently folded to form the reinforced shipping container.

In some examples, the substrate 1304 may be cut and formed into a shipping container before the reinforcement 1306 is applied. For example, the shipping container may be formed into the three dimensional box shape and then subsequently painted or sprayed on an outside surface, or inside surface, according to the reinforcement profile.

FIGS. 14 and 15 illustrates example flow diagrams showing processes 1400 and 1500, as described herein. The processes 1400 and 1500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Each of processes 1400 and 1500 may be performed remotely from or in connection with a manufacturing process for producing reinforced shipping containers. For example, in a single facility operation, the reinforcement profile may be generated according to processes 1400 and 1500 and subsequently used to generate reinforced shipping containers. In another example, the reinforcement profile may be generated remotely via a computer system and used to generate manufacturing instructions or manufacturing aids such as templates and screen-guides for applying reinforcing material to a substrate in a separate location from the computer system.

FIG. 16 illustrates an example process 1400 for reinforcing a shipping container, according to at least one example. The process 1400 may be used to generate instructions for a manufacturing apparatus to reinforce a shipping container, or to form a reinforced shipping container as described above. A manufacturing management engine 1606A or 1606B (FIG. 18), whether embodied in a manufacturing management system 1602 (FIG. 18) or a user device 1604 (FIG. 18), may perform the process 1400. In some examples, a first portion of the process 1400 may be performed by the user device 1604 and a second portion of the process 1400 may be performed by the manufacturing management system 1602.

The process 1400 may illustrate a procedure performed as a service for end-users or customers, where user's provide load information and stress data or characteristics from their shipping platforms and systems and the process 1400 is used to output or generate a shipping container that has a reduced weight over typical packaging and can withstand the unique factors and forces of the user's shipping process.

The process 1400 may begin at block 1402 with determining an expected load on a shipping container. The expected load may be a static load applied to a single surface of the shipping container, or may include multiple different load conditions, such as a static load on a first face and an impacting load or collision on a second face of the shipping container. The expected load may also include fixed constraints, such as one or more fixed faces or points where the shipping container contacts or abuts adjacent physical objects and is restricted in movement in those directions. This expected load information may be input by a user or may be received from a computing device (e.g., the user device 1604).

In some examples, the expected load information may include unique stresses associated with shipment or transportation known or measured by a user. For example, a user may provide information such as the type and magnitude of typical stresses and loadings during their shipping processes to the process 1400 at block 1402.

At block 1404, the process includes generating a three dimensional model of the shipping container. The three dimensional model may be a digital representation of a shipping container. In some examples, the three dimensional model may be representative of a particular size and shape of a shipping container. In some examples, the three dimensional model may be representative of a number of different sizes of shipping containers, each having the same or similar relative dimensions. The three dimensional model may be generated by a computing device based on inputs from a user, or may be input or received from a user or user device.

At block 1406, the expected load is simulated on the three dimensional model of the container. The simulation may be a finite element analysis of the three dimensional model based on the constraints and parameters laid out in the expected load information received at block 1402. The simulation may also use any other modeling and simulation technique or software to provide a digital simulation of a force applied to a body, the body having particular physical properties that responds and reacts to the force applied.

At block 1408, a computing device may determine a reinforcement shape to be applied to the shipping container. The reinforcement shape may be the reinforcement profile of FIGS. 5 and 7 above. The reinforcement shape may be scalable for shipping containers of varying dimensions, though the relative dimensions of the shipping containers remain unchanged. For example, a particular reinforcement shape may be determined for a cube-shaped shipping container. The particular reinforcement shape may be scaled up or down based on the edge lengths of the cube-shaped shipping container. In some examples, each reinforcement profile may be unique to the particular size, shape, and expected load of a shipping container, determined individually.

The shape of the reinforcement may be determined by performing a topological simulation on the three dimensional model based on the expected load input to the simulation. The topological simulation performs a mathematical method to determine a layout of material, in this case a reinforcing material, within a given space based on the expected load scenario. The topological simulation may be performed to define or determine where a fixed weight of material may be added to maximize or otherwise enhance a strength-to-weight ratio for the particular fixed weight of material, including the fiberboard material as well as the reinforcing material in the weight. For example, the topological simulation may apportion the fixed weight of material to increase the strength of a panel or container by focusing material in areas where failure initiates. The topological simulation determines a distribution of reinforcing material given the expected load and the constraints applied to the shipping container. The shape or distribution of reinforcing material is determined to increase the strength, rigidity, or other physical properties of the shipping container to resist the expected load while reducing the weight by only applying reinforcing material where it is needed most.

Determining the reinforcement shape may be based on a threshold, such as a maximum stress that will be allowed on the shipping container. For example, a percentage of the crush strength or failure strength of the shipping container may be set as a stress criterion. When the expected load is simulated, any regions of the shipping container that experience at least the stress criterion are identified as receiving reinforcement. The stress criterion may include a predetermined stress threshold, a percentage of a maximum stress level, a percentage of a crush stress or force, or any other such criterion or threshold.

The reinforcement shape may also be constrained by the material properties of the reinforcement as well as the substrate. For example, the reinforcement material may have a greater density than the substrate and applying the reinforcement over the entire substrate may provide greater strength or resistance, but will also significantly increase the weight of the shipping container. In determining the shape of the shipping container, the computing device may also factor in the relative density or the reinforcement and the substrate to produce a shipping container that is both lighter and stronger than an unreinforced, typical shipping container.

The reinforcement shape may be output by the process 1400 to generate manufacturing instructions, to provide an updated shipping container model for further simulation, or for use in generating templates for applying, screen-printing, or otherwise selectively applying the reinforcement pattern onto a substrate.

At block 1410, a location for the reinforcement shape on the shipping container is determined. Block 1408 and block 1410 may be performed simultaneously, as the shape and the location of the reinforcement profile will each be determined, potentially through a topological simulation as described above. The location may include the location on a panel of a shipping container as well as which panel of the shipping container receives the reinforcement. In some examples, different panels of a shipping container may receive different reinforcement profiles, such as a side panel and a top or bottom panel due to differences in expected loads on those faces. In some instances, some panels of the shipping container may receive reinforcements while others are unreinforced.

FIG. 17 illustrates an example process 1500 for generating manufacturing instructions for producing a reinforced shipping container, according to at least one example. The process 1500 may be used to generate instructions for a manufacturing apparatus to reinforce a shipping container, or to form a reinforced shipping container. A manufacturing engine 1606A or 1606B (FIG. 18), whether embodied in a manufacturing management system 1602 (FIG. 18) or a user device 1604 (FIG. 18), may perform the process 1500. In some examples, a first portion of the process 1500 may be performed by the user device 1604 and a second portion of the process 1500 may be performed by the manufacturing management system 1602.

The process 1500 may begin at block 1502 with a computing device receiving a container model. The container model is a digital model of a shipping container, as described above. The container model may be input by a user or may be received from a separate computing device. The container model may be a thin-walled model that can be imported into a software module capable of performing a finite element analysis. The container model includes a plurality of panels that can contain an item for transport.

At block 1504 the process 1500 includes receiving expected load data. The expected load data may include the expected load from block 1402 of FIG. 16. The expected load may be a static load applied to a single surface of the shipping container, or may include multiple different load conditions, such as a static load on a first face and an impacting load or collision on a second face of the shipping container. The expected load may also include fixed constraints, such as one or more fixed faces or points where the shipping container contacts or abuts adjacent physical objects and is restricted in movement in those directions. This expected load information may be input by a user or may be received from a computing device (e.g., the user device 1604).

At block 1504, the load data may also include specific shipping stresses unique to a particular customer or shipper. For example, one shipper may use exclusively ground transportation while another ships exclusively via ship or airplane. The stresses on shipping containers during shipment will vary. Additionally, sorting and handling facilities each introduce different unique loads onto shipping containers, such as collisions between containers on slides or ramps and stacked configurations onto pallets or in chutes.

At block 1506 the process 1500 includes generating stress data based on the expected load data from block 1504. The stress data may be generated by a computing device performing a simulation. The simulation may be a finite element analysis of the three dimensional model based on the constraints and parameters laid out in the expected load information received at block 1504. The simulation may also use any other modeling and simulation technique or software to provide a digital simulation of a force applied to a body, the body having particular physical properties that responds and reacts to the force applied.

At block 1508 the process 1500 includes determining a reinforcement profile. The reinforcement shape may be the reinforcement profile of FIGS. 5 and 7 above. The reinforcement shape may be scalable for shipping containers of varying dimensions, though the relative dimensions of the shipping containers remain unchanged. For example, a particular reinforcement shape may be determined for a cube-shaped shipping container. The particular reinforcement shape may be scaled up or down based on the edge lengths of the cube-shaped shipping container. In some examples, each reinforcement profile may be unique to the particular size, shape, and expected load of a shipping container, determined individually.

The shape of the reinforcement may be determined by performing a topological simulation on the three dimensional model based on the expected load input to the simulation. The topological simulation performs a mathematical method to determine a layout of material, in this case a reinforcing material, within a given space based on the expected load scenario. The topological simulation determines a distribution of reinforcing material given the expected load and the constraints applied to the shipping container. The shape or distribution of reinforcing material is determined to increase the strength, rigidity, or other physical properties of the shipping container to resist the expected load while reducing the weight by only applying reinforcing material where it is needed most.

Determining the reinforcement shape may be based on a threshold, such as a maximum stress that will be allowed on the shipping container. For example, a percentage of the crush strength or failure strength of the shipping container may be set as a stress criterion. When the expected load is simulated, any regions of the shipping container that experience at least the stress criterion are identified as receiving reinforcement. The stress criterion may include a predetermined stress threshold, a percentage of a maximum stress level, a percentage of a crush stress or force, or any other such criterion or threshold.

The reinforcement shape may also be constrained by the material properties of the reinforcement as well as the substrate. For example, the reinforcement material may have a greater density than the substrate and applying the reinforcement over the entire substrate may provide greater strength or resistance, but will also significantly increase the weight of the shipping container. In determining the shape of the shipping container, the computing device may also factor in the relative density or the reinforcement and the substrate to produce a shipping container that is both lighter and stronger than an unreinforced, typical shipping container.

At block 1510 the process 1500 includes generating manufacturing instructions. The manufacturing instructions may be instructions to cause a manufacturing apparatus 1610 to form a reinforced shipping container. The manufacturing instructions may be generated by a user device 1604 or a manufacturing management system 1602 (FIG. 18). In some examples, the manufacturing management system 1602 manages the operation of the manufacturing apparatus 1610. In some examples, the manufacturing apparatus may be a painting, spraying, injecting, or coating apparatus as described above. The manufacturing apparatus may selectively apply a reinforcement to a fiberboard substrate and then form the reinforced fiberboard substrate into a reinforced shipping container.

FIG. 18 illustrates an example schematic architecture or system 1600 for implementing techniques relating to generating instructions for producing reinforced shipping containers, according to at least one example. The system 1600 may include the manufacturing management system 1602 in communication with one or more user devices 1604(1)-1604(N) (hereinafter, "the user device 1604") via one or more networks 1608 (hereinafter, "the network 1608"). The user device 1604 may be operable by one or more users 1601 (hereinafter, "the user 1601") to interact with the manufacturing management system 1602. The network 1608 may include any one or a combination of many different types of networks, such as cable networks, the Internet, wireless networks, cellular networks, and other private and/or public networks. The user 1601 may be any suitable user including, for example, customers of an electronic marketplace that are associated with the manufacturing management system 1602, or any other suitable user.

The manufacturing management system 1602 may implement techniques relating to generating instructions for producing reinforced shipping containers, as described herein. The manufacturing management system 1602 communicates with the user device 1604 and a manufacturing apparatus 1610. The manufacturing apparatus 1610 could be a computer-controlled spraying head, a robotic sprayer, a robotic paint applicator, a robotic epoxy applicator, a robotic injection device, or other such device. Using any suitable software, application, etc. running on the user device 1604 or otherwise, the user 1601 may provide input to the manufacturing management system 1602 to design a reinforced shipping container. The reinforced shipping container may be produced by the manufacturing apparatus 1610 (which may also be more than one manufacturing apparatus 1610), e.g., using spray coating, painting, injecting, and/or any suitable application technique to apply a reinforcement to a fiberboard substrate.

In some examples, the manufacturing management system 1602 may output a reinforcement profile as described above that is then used to generate a manufacturing template or screen for applying a reinforcing material onto a substrate. The template or screen may be used with spraying, screen-printing, coating, or other similar application methods and be positionable on a substrate of fiberboard. When the reinforcing material is applied to the substrate through the template, the template or screen is a negative of the reinforcement profile and allows the reinforcing material to contact the substrate in the shape of the reinforcement profile, while the inverse of the reinforcement profile is blocked to prevent reinforcing material from being applied to the substrate in those areas.

In order to produce the reinforced shipping container, the user 1601 may use the user device 1604 to provide reinforcement profile information that represents the shape, size, and location of reinforcement to be applied to a panel of a shipping container to the manufacturing management system 1602. The reinforcement profile information may be generated at the user device 1604 or at the manufacturing management system 1602 based on inputs received at the user device 1604. In some examples, the manufacturing management system 1602 may include one or more server computers configured to perform the techniques described herein. In some examples, the manufacturing apparatus 1610 may include one or more computing devices configured to process the reinforcement profile information and generate a set of manufacturing instructions. The manufacturing instructions may be generated by a user device 1604 or a manufacturing management system 1602. In some examples, the manufacturing management system 1602 manages the operation of the manufacturing apparatus 1610.

The manufacturing apparatus 1610 may also be in communication with at least the manufacturing management system 1602 via a secondary network 1616. The secondary network 1616 may include any one or a combination of many different types of networks, such as cable networks, the Internet, wireless networks, cellular networks, and other private and/or public networks. In some examples, the secondary network 1616 may also include hard-wired connection between the manufacturing management system 1602 and the manufacturing apparatus 1610. In any event, instructions may be sent from the manufacturing management system 1602 via the secondary network 1616 to the manufacturing apparatus 1610. In some examples, the manufacturing apparatus 1610 sends information in the form of feedback to the manufacturing management system 1602 via the secondary network 1616 or otherwise (e.g., by writing to a disk and transferring). In some examples, the manufacturing apparatus 1610 also communicates via the network 1608.

Turning now to the details of the user device 1604, the user device 1604 may be any suitable type of computing device such as, but not limited to, a digital camera, a wearable device, a tablet, a mobile phone, a smart phone, a personal digital assistant (PDA), a laptop computer, a desktop computer, a thin-client device, a tablet computer, a set-top box, or any other suitable device capable of communicating with the manufacturing management system 1602 via the network 1608 or any other suitable network. For example, the user device 1604(1) is illustrated as an example of a smart phone, while the user device 1604(N) is illustrated as an example of a laptop computer.

The user device 1604 may include a manufacturing management engine 1606B within memory 1612. Within the memory 1612 of the user device 1604 may be stored program instructions that are loadable and executable on processor(s) 1614, as well as data generated during the execution of these programs. Depending on the configuration and type of user device 1604, the memory 1612 may be volatile (such as random access memory (RAM)) and/or non-volatile (such as read-only memory (ROM), flash memory, etc.). The manufacturing management engine 1606B, stored in the memory 1612, may allow the user 1601 to interact with the manufacturing management system 1602 via the network 1608. Such interactions may include, for example, interacting with user interfaces provided by the manufacturing management system 1602, selecting reinforcement profiles, customizing the size and shape of a reinforcement profile, selecting a shipping container model from a library, or performing any other interaction described herein or relating to manufacturing reinforced shipping containers, and any other suitable client-server interactions.

Turning now to the packaging engine 1638, the packaging engine 1638 may be included with the user device 1604 or the manufacturing management system 1602, or may be an entirely separate computing system (not shown) that communicates over the network 1608. The packaging engine receives information related to the shipping containers including the dimensions of various packages produced by a particular user as well as expected stresses or loads, which may be estimated or provided by a user based on their knowledge of their shipping processes and stresses. The packaging engine 1638 may receive all of the above information and output shipping container data as well as expected load data to the manufacturing management engine 1606 over the network 1608.

Turning now to the details of the manufacturing management system 1602, the manufacturing management system 1602 may include one or more service provider computers, perhaps arranged in a cluster of servers or as a server farm, and may host web service applications. These servers may be configured to host a website (or combination of websites) viewable on the user device 1604 (e.g., via the manufacturing management engine 1606B). The user 1601 may access the website to view models of shipping containers in a library or reinforcement profiles that can be selected. These may be presentable to the user 1601 via the web service applications.

The manufacturing management system 1602 may include at least one memory 1618 and one or more processing units (or processor(s)) 1620. The processor 1620 may be implemented as appropriate in hardware, computer-executable instructions, software, firmware, or combinations thereof. Computer-executable instruction, software, or firmware implementations of the processor 1620 may include computer-executable or machine-executable instructions written in any suitable programming language to perform the various functions described. The memory 1618 may include more than one memory and may be distributed throughout the manufacturing management system 1602. The memory 1618 may store program instructions that are loadable and executable on the processor(s) 1620, as well as data generated during the execution of these programs. Depending on the configuration and type of memory including the manufacturing management system 1602, the memory 1618 may be volatile (such as random access memory (RAM)) and/or non-volatile (such as read-only memory (ROM), flash memory, or other memory). The memory 1618 may include an operating system 1622 and one or more application programs, modules, or services for implementing the techniques described herein including at least a manufacturing management engine 1606A. In some examples, the manufacturing apparatus 1610 is configured to perform the techniques described herein with reference to the manufacturing management system 1602, including the manufacturing management engine 1606A. For example, the manufacturing apparatus 1610 may include a comparable engine to the manufacturing management engine 1606A. In some examples, the user device 1604 may be configured to perform the techniques described herein with reference to the manufacturing management system 1602, including the manufacturing management engine 1606A. For example, the user device 1604 may include a comparable engine to the manufacturing management engine 1606A. Either of the manufacturing management engine 1606A or 1606B may perform the operations described herein. In this example, the user 1601 may use the user device 1604 to generate manufacturing instructions. The manufacturing instructions may then be provided to the manufacturing apparatus 1610 in order to produce the reinforced shipping container. For example, the manufacturing instructions may be saved to a disk and transferred via the disk to the manufacturing apparatus 1610 or provided via a local or wide area network, or other connection.

The manufacturing management system 1602 may also include additional storage 1624, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1624, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the manufacturing management system 1602, the user device 1604, and/or the manufacturing apparatus 1610.

The manufacturing management system 1602 may also include input/output (I/O) device(s) and/or ports 1626, such as for enabling connection with a keyboard, a mouse, a pen, a voice input device, a touch input device, a display, speakers, a printer, or other I/O device.

The manufacturing management system 1602 may also include a user interface 1628. The user interface 1628 may be utilized by an operator or one of the users 1601 to access portions of the manufacturing management system 1602. In some examples, the user interface 1628 may include a graphical user interface, web-based applications, programmatic interfaces such as application programming interfaces (APIs), or other user interface configurations. The manufacturing management system 1602 may also include a data store 1630. In some examples, the data store 1630 may include one or more data stores, databases, data structures, or the like for storing and/or retaining information associated with the manufacturing management system 1602. Thus, the data store 1530 may include databases, such as a reinforcement profile database 1632, a model database 1634, and a container database 1636.

The reinforcement profile database 1632 may be used to retain information pertaining to different reinforcement profiles previously determined through the process 1400 above. Such information may include, for example, reinforcement shapes and data relating to the percentage of surface area coverage as well as density and load information used to generate the reinforcement profiles. The reinforcement profile database 1632 may include two dimensional profiles that may be applied to panels of a shipping container.

The model database 1634 may be used to retain three-dimensional models corresponding to shipping containers. The three dimensional models may include the reinforcement profiles from the reinforcement profile database 1632, or reference to the reinforcement profile database 1632. The three dimensional models may also include associated load information and layouts of various reinforcement profiles on a single shipping container model. The model database 1634 may be referenced when the manufacturing management engine 1606A attempts to identify a particular three-dimensional model of a shipping container, or generate manufacturing instructions. The model database 1634 may be configured to store any suitable data in any suitable format (e.g., computer-aided drafting (CAD) file such as a STereoLithography file or .STL format) capable of storing a representation of a three-dimensional item.

The container database 1636 may be used to retain information about shipping container shapes, sizes, and relative dimensions. For example, the container database 1636 may include a catalog of shipping container varieties produced by a particular manufacturer or manufacturing device and may include a table that includes all relevant information relating to each shipping container available from the manufacturer.

Figure 19:
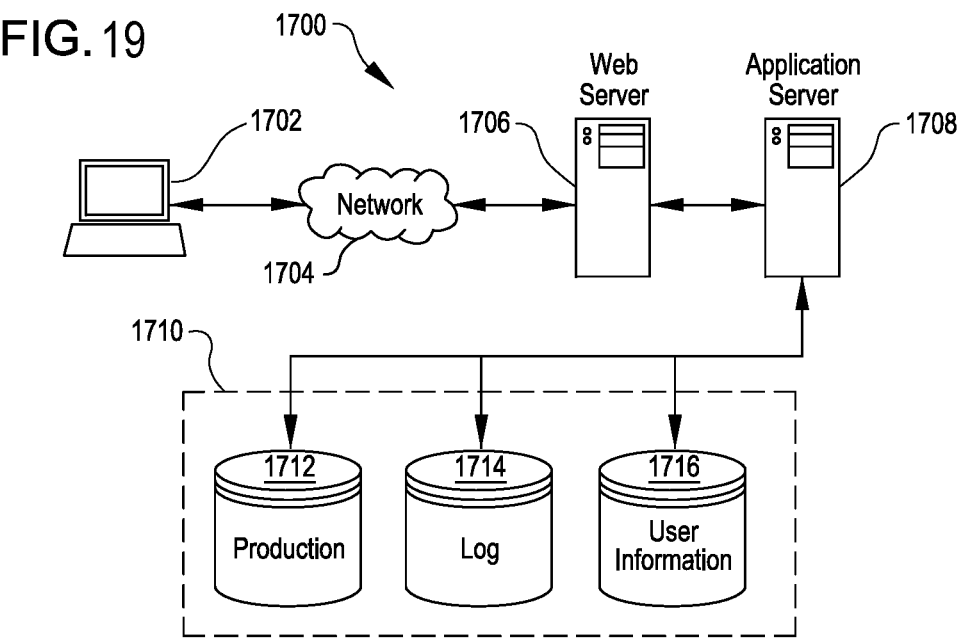
FIG. 19 illustrates an environment in which various techniques relating to generating instructions for manufacturing shipping containers with reinforced panels may be implemented, according to at least one example.

FIG. 19 illustrates aspects of an example system 1700 for implementing aspects in accordance with various examples. As will be appreciated, although a Web-based environment is used for purposes of explanation, different environments may be used, as appropriate, to implement various examples. The environment includes an electronic client device 1702, which can include any appropriate device operable to send and receive requests, messages, or information over an appropriate network 1704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1700 in FIG. 19 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A system, comprising:
   one or more processors; and
   one or more non-transitory computer-readable storage devices comprising computer-executable instructions that, when executed by the one or more processors, cause the one or more processors to at least:
      receive a model of a container, the container comprising a plurality of panels and configured to contain at least one item during transport;
      receive expected load data describing an expected load on the container during transport;
      generate stress data resulting from the expected load by simulating the expected load on the model of the container using the expected load data; and
      generate a reinforcement profile where a reinforcing material is to be applied to a panel of the plurality of panels of the container based at least in part on the stress data; and generate, based at least in part on the reinforcement profile, manufacturing instructions for reinforcing the panel by applying a reinforcing material to the panel.

2. The system of claim 1, wherein the instructions further cause the one or more processors to at least:
provide the manufacturing instructions to a coating machine; and
instruct the coating machine to apply the reinforcing material onto a substrate of the panel in accordance with the manufacturing instructions.

3. The system of claim 1, wherein the instructions further cause the one or more processors to at least:
provide the manufacturing instructions to a coating machine; and
instruct the coating machine to reinforce the panel by filling interstitial voids of a substrate of the panel.

4. The system of claim 1, wherein generating the reinforcement profile is based at least in part on a material property of the reinforcing material.

5. The system of claim 4, wherein the material property of the reinforcing material is at least one of:
a density of the reinforcing material;
a strength of the reinforcing material; or
a stiffness of the reinforcing material.

6. The system of claim 1, wherein the instructions further cause the one or more processors to at least: in accordance with a determination, based at least in part on the stress data, that a stress criterion is satisfied, identifying one or more stressed regions within the panel, and wherein determining the reinforcement profile comprises determining the reinforcement profile based at least in part on the one or more stressed regions.

7. The system of claim 6, wherein the stress criterion is determined based at least in part on a percentage of a failure stress of the panel.

8. The system of claim 1, wherein the expected load data comprises:
a load value;
a load location; and
a static or dynamic load indicator.

9. A method, comprising:
receiving a finite element model of a fiberboard shipping container configured to hold at least one item for shipping, the fiberboard shipping container comprising a plurality of panels that together define an exterior of the fiberboard shipping container;
receiving an expected load profile that represents an expected load scenario of the fiberboard shipping container, the expected load scenario defining an expected load location on the fiberboard shipping container and an expected load amount at the expected load location;
performing, based at least in part on the expected load profile, a load simulation using the finite element model of the fiberboard shipping container to generate stress data, the stress data identifying stresses within the fiberboard shipping container as a result of the expected load scenario as identified during the load simulation;
in accordance with a determination, based at least in part on the stress data, that a stress criterion is satisfied, identifying a stressed region within at least one panel of the plurality of panels;

determining, using a topological simulation technique, a reinforcement profile for the at least one panel, wherein a shape of the reinforcement profile is determined directly from a shape and a location of the stressed region; and
outputting the reinforcement profile for manufacturing a reinforced shipping container.

10. The method of claim 9, further comprising generating manufacturing instructions for applying a reinforcing material to a substrate based at least in part on the reinforcement profile.

11. The method of claim 10, wherein the substrate is at least one of a fluting substrate, an interstitial void, or a surface of a fiberboard product.

12. The method of claim 10, wherein the reinforcing material comprises an epoxy or a hardening starch.

13. The method of claim 9, wherein the reinforcement profile covers up to one hundred percent of a surface area of the at least one panel.

14. The method of claim 9, wherein the stressed region is a first stressed region, the at least one panel is a first panel, the reinforcement profile is a first reinforcement profile, and the shape of the first reinforcement profile is a first shape, and the method further comprises:
identifying a second stressed region within a second panel of the plurality of panels; and
determining, using the topological simulation technique, a second reinforcement profile for the second panel, wherein a second shape of the second reinforcement profile relates to the second stressed region.

15. The method of claim 14, wherein the second shape is different from the first shape.

16. A reinforced shipping container, comprising:
a body comprising:
a first panel formed of a fiberboard substrate forming a first portion of the body;
a second panel formed of the fiberboard substrate forming a second portion of the body; and
a reinforcement comprising a fiberboard stiffener material applied to at least one of the first panel or the second panel in a shape, the shape based at least in part on a topological simulation of an expected load profile applied to the reinforced shipping container.

17. The reinforced shipping container of claim 16, wherein the fiberboard stiffener material comprises an epoxy or a hardening starch.

18. The reinforced shipping container of claim 16, wherein the reinforcement covers between twenty and forty percent of a surface area of the at least one of the first panel or the second panel.

19. The reinforced shipping container of claim 16, wherein the fiberboard stiffener material is applied to fill an interstitial void of a corrugated fiberboard product.

20. The reinforced shipping container of claim 16, wherein the reinforcement comprises:
a first reinforcement applied to the first panel and having a first shape; and
a second reinforcement applied to the second panel and having a second shape.

* * * * *